(12) United States Patent
Larsson et al.

(10) Patent No.: US 9,222,338 B2
(45) Date of Patent: Dec. 29, 2015

(54) TOOL FOR A HORIZONTAL CONNECTING DEVICE

(75) Inventors: Johan Larsson, Årjäng (SE); Sigvard Omvik, Moss (NO)

(73) Assignee: Aker Subsea AS, Lysaker (NO)

( * ) Notice: Subject to any disclaimer, the term of this patent is extended or adjusted under 35 U.S.C. 154(b) by 0 days.

(21) Appl. No.: 13/500,652

(22) PCT Filed: Oct. 6, 2010

(86) PCT No.: PCT/NO2010/000356
§ 371 (c)(1),
(2), (4) Date: Apr. 6, 2012

(87) PCT Pub. No.: WO2011/043672
PCT Pub. Date: Apr. 14, 2011

(65) Prior Publication Data
US 2012/0201607 A1    Aug. 9, 2012

(30) Foreign Application Priority Data

Oct. 7, 2009   (NO) .................................. 20093107
Jan. 27, 2010  (NO) .................................. 20100131

(51) Int. Cl.
*F16L 1/12* (2006.01)
*E21B 43/01* (2006.01)
*F16L 1/26* (2006.01)

(52) U.S. Cl.
CPC .............. *E21B 43/0107* (2013.01); *F16L 1/26* (2013.01)

(58) Field of Classification Search
CPC .................. F16L 1/26; F16L 1/09; F16L 1/12
USPC .................................................. 405/169–170
See application file for complete search history.

(56) References Cited

U.S. PATENT DOCUMENTS

| 4,477,205 | A  | * | 10/1984 | Morrill et al. ................. | 405/169 |
| 4,568,221 | A  | * | 2/1986  | Lerique ......................... | 405/169 |
| 4,693,636 | A  | * | 9/1987  | Fraser et al. ................... | 405/169 |
| 5,730,551 | A  | * | 3/1998  | Skeels et al. .................. | 405/170 |
| 5,934,832 | A  | * | 8/1999  | Baugh ........................... | 405/173 |
| 5,975,803 | A  | * | 11/1999 | Mackinnon ..................... | 405/169 |
| 6,024,514 | A  | * | 2/2000  | Ostergaard ..................... | 405/170 |
| 6,340,057 | B1 | * | 1/2002  | Dantas .......................... | 166/337 |
| 6,997,645 | B2 | * | 2/2006  | von Trepka et al. .......... | 405/170 |
| 7,086,807 | B2 | * | 8/2006  | Mackinnon ..................... | 405/170 |
| 7,402,000 | B2 | * | 7/2008  | Bastesen et al. .............. | 405/170 |
| 2003/0049076 | A1 | * | 3/2003 | Bekkevold et al. ........... | 405/170 |

(Continued)

FOREIGN PATENT DOCUMENTS

NO     325935 B1     8/2008
WO     2008/063080 A1  5/2008

*Primary Examiner* — Doug Hutton, Jr.
*Assistant Examiner* — Patrick Lambe
(74) *Attorney, Agent, or Firm* — Birch, Stewart, Kolasch & Birch, LLP (57) ABSTRACT

A tool for lowering, alternatively later retrieval, of a pipeline end which is provided with a connecting part designed for mating with and connection to a first connecting part on the seabed is shown. The tool is so arranged that the tool can be brought to the surface again for reuse. The tool comprises a central lifting frame, a guiding part forming an extension of the lifting frame and a lifting yoke, which tool includes gripping mechanisms which, in one situation, are actuatable to partly circumscribe and retain the pipeline end, and, in a second situation, the gripping mechanisms are releasable to release the pipeline end from the lifting frame.

16 Claims, 10 Drawing Sheets

(56) References Cited

U.S. PATENT DOCUMENTS

| | | | |
|---|---|---|---|
| 2004/0265066 A1* | 12/2004 | Mackinnon | 405/170 |
| 2005/0141967 A1* | 6/2005 | Giles et al. | 405/158 |
| 2007/0269270 A1* | 11/2007 | Bastesen et al. | 405/170 |
| 2008/0014026 A1* | 1/2008 | Routeau et al. | 405/224.2 |
| 2009/0058076 A1* | 3/2009 | Giles et al. | 285/24 |
| 2009/0297274 A1* | 12/2009 | Cafaro et al. | 405/170 |

* cited by examiner

TOOL FOR A HORIZONTAL CONNECTING DEVICE

The present invention relates to a tool for lowering, alternatively later retrieval, of a pipeline end provided with a connecting part designed for "horizontal" mating with and connection to a first connecting part on the sea bed, and is so arranged that the tool can be brought to the surface again for reuse.

The tool is in particular developed with a view to deploy on the seabed a connecting device of the type described in Norwegian Patent Application NO 2009 3107 having the same applicant and inventor as in the present application. Reference is hereby given to that patent application.

In this context "horizontal connecting device" has that meaning that the connecting parts are mated in a substantially horizontal direction.

On subsea structures, for example manifold and valve structures, which are deployed on the seabed, piping is often arranged thereon having one or more pipes that terminate in open pipe subs, or porches, forming a connecting point. Each connecting point includes a stationary connecting part. In this context "Stationary" means relative to the subsea structure. The connecting point is later used for connection to an external pipe.

There exist two principles for the connecting devices, either vertical or horizontal. For a horizontal connecting device the connecting point projects horizontally out from the structure. In the North Sea this solution almost has market control. Other places, like the Gulf of Mexico for example, the vertical solution is the most common one.

One example of a vertical connecting device is shown in NO 2009 2880.

It is to be mentioned that in principle there are three (or actually two) different forms for external connections to a structure:

Direct connection between two structures. Here, a rigid pipe having a mobile connecting part at each end normally will be used. This will usually be termed a jumper. The jumper will be manufactured based on measuring the relative position of the two connecting points.

Connection between the end of a pipeline (rigid pipe) and a structure. It is almost impossible (at least very difficult) to connect a rigid pipe line directly to a structure preinstalled on the seabed. Thus, an intermediate piece of pipe, frequently termed a "spool", is provided between the pipe line and the structure. In order to be able to connect the spool to the pipeline, the pipeline will be welded directly to a small structure including a connecting point. A spool is in principle like the jumper described above.

Direct connection of a flexible pipeline or umbilical to a structure. In some cases it is chosen to use so called flexible pipes in stead of rigid steel pipes. Such pipes can be compared with a big garden hose. Then it is not necessary with a spool or jumper between the end of the pipe and the structure. The pipe is so flexible that one may have a mobile connector part right on the end of the pipe, and connect this one directly to the stationary connector part on the structure. Then it is neither necessary to make precise measurements of the position on the connecting point on the structure.

It is to the latter principle this application is related.

The tool has several main components and is such designed in one embodiment that each main component is in the form of a replaceable module. The tool can be used to deploy both a first and a second end of a flexible pipeline, yet after having made some modifications on the tool. The problems to be addressed can be somewhat different when the first end is to be laid from a surface vessel and down to the seabed compared with deployment of the second end.

According to the present invention, a tool of the introductory said kind is provided, which tool is distinguished in that the tool comprises a central lifting frame, a guiding part forming an extension of the lifting frame, and a lifting yoke, which tool includes gripping mechanisms which, in one situation, are actuatable to partly circumscribe and retain the pipeline end, and, in a second situation, the gripping mechanisms are releasable to release the pipeline end from the lifting frame In one embodiment the gripping mechanisms are releasable from the pipeline end by operation (by ROV) of actuating means that preferably are accessible from above.

Preferably, each gripping mechanism includes a pawl that is pivotable arranged to the lifting frame where the pawl can be influenced by said actuating means which in turn acts against an inclined surface of the pawl in order to cause said pivoting motion.

In a suitable embodiment the tool is assembled of modules including a central lifting frame module, one control module releasable from the lifting frame module that forms an extension of the lifting frame module, and a lifting yoke module releasable from the lifting frame module, which lifting frame module includes said gripping mechanisms.

The control module can be releasable from the lifting frame module by means of quick release means, such as a hook, lock pin or cotter pin.

The lifting yoke module may in turn be releasable from the lifting frame module by means of quick release means, such as a lock pin, snap hook or cotter pin.

It is to be noted that the tool is in particular designed to operate a connecting device that includes:

a first connecting part supporting or retaining a first end of a first pipeline, which first connecting part and first pipeline are designed to be landed and deployed on the seabed in beforehand, and where the first connecting part includes a control structure located a distance apart from the pipe end, a second submersible connecting part supporting, or retaining a second end of a second pipeline, which second connecting part and second pipeline are designed to be lowered from the surface together with the tool towards the first connecting part, and where the second connecting part includes the control module located a distance apart from the pipe end, and a connector arranged between the connecting parts for final connection between the pipe ends.

Suitably, the control module cooperates with the guiding structure during a lowering motion of the second connecting part and pivots the second connecting part into coarse alignment of the second pipe end in a direction towards the first pipe end such that the first and second pipelines are brought to align with each other on the sea bed, and the first connecting part includes an adjacent ramp structure having abutment surfaces and guiding means designed for engagement with cooperating surfaces and means on the second connecting part when the second connecting part is displaced towards the first connecting part to fine alignment of the pipe ends.

The adjacent ramp structure is normally physically separated from the first connecting part such that the second connecting part can be parked on the ramp structure subsequent to that a disconnecting operation between the connecting parts is made, where structure that the first connecting part is a part of thus can be retrieved to the surface as required, while the or the other connecting parts remain parked in respective ramp structures on the seabed.

The guiding means of the ramp structure can include a projecting plate part, and the cooperating means of the second connecting part include an incision, where the projecting plate part and the incision comes into engagement with each other when the pipe ends approach each other and then prevent possible tilting motion of the second connecting part.

The abutment surfaces of the ramp structure may include ramp surfaces that the cooperating surfaces of the second connecting part act against and provide fine alignment between the pipe ends when the second connecting part is advanced towards the first connecting part.

The guiding structure can be an upwardly projecting frame structure which is able to receive the corresponding control module arranged on the second connecting part.

The control module of the second connecting part can include a projecting bail structure that, in an initial phase, in a sliding manner, cooperates with the upwardly projecting frame structure of the first connecting part, and when the bail structure is completely introduced into and bottoms out against a portion of the upwardly projecting frame structure, the second connecting part pivots until abutment with the ramp structure, said pipe ends are thus coarsely aligned.

The first connecting part can include at least one control pin and the second connecting part can correspondingly include at least a cooperating female part which together constitutes additional guiding means.

The connector can constitute an integrated part of the connecting device, where the connector is secured to the second connecting part and the second connecting part is displaceable in a direction towards and away from the first connecting part, where the pipe ends in this way are positioned before final connection of the pipe ends is made by said connector.

Other and further objects, features and advantages will appear from the following description of preferred embodiments of the invention, which is given for the purpose of description, and given in context with the appended drawings where.

Figure 1:
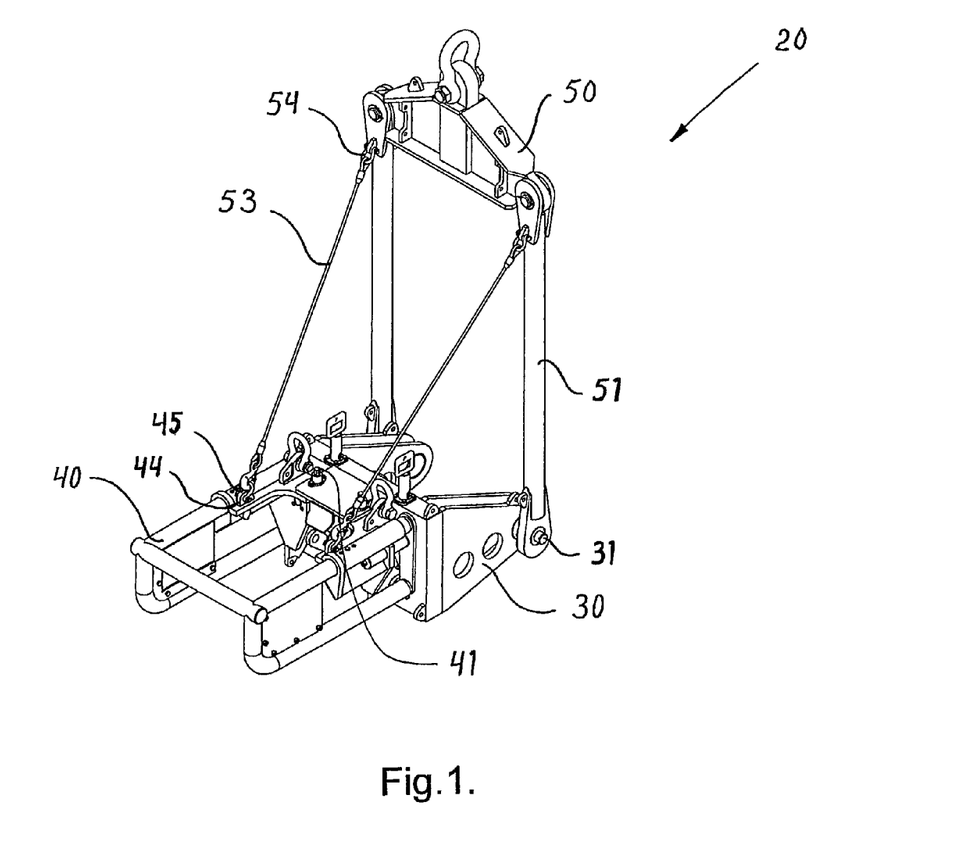
FIG. 1 shows in perspective view a tool according to the invention.

FIG. 1 shows the tool 20 as the tool appears alone when not in use, i.e. that no pipe end is present in the tool 20. As previously mentioned, such a tool is used to lower a pipeline end to the seabed. Pipelines for this purpose terminates in a connecting part 2 that can be clearest seen in FIG. 6. This connecting part 2 is to be guided towards a first connecting part 1, which already has been put down onto the seabed, to be able to make a connection between the connecting parts 1 and 2. After that the connecting operation is completed, the tool 20 is allowed to be brought to the surface again for later use.

Figure 2:
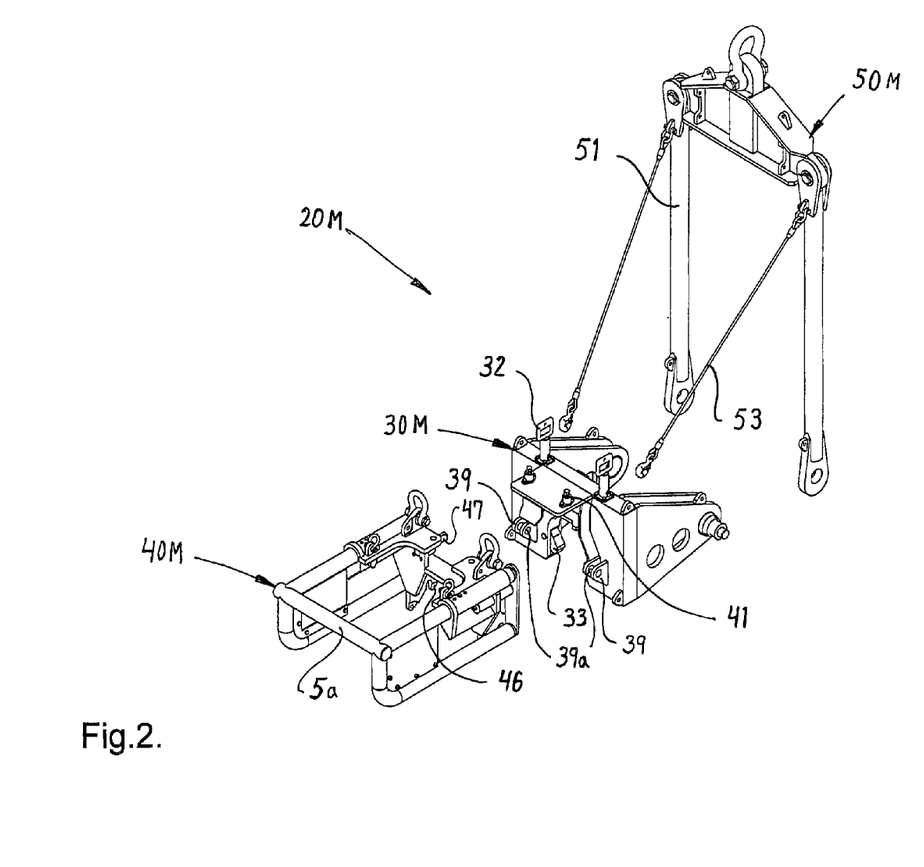
FIG. 2 shows in perspective view a tool according to the invention, where the individual main components are separated from each other and constitute modules.

The tool 20 includes a central lifting frame 30 which is able to retain, or support, a pipe end $E_2$ (not shown in FIGS. 1 and 2, but 3). A lifting yoke 50 is connected to the lifting frame 30. The lifting yoke 50 includes two rods 51 that are pivotably connected to the lifting frame 30 via axle pins 31. The lifting yoke 50 has a limited freedom of motion to pivot about the axle pins 31. The limitation is set by two straps 53, or wires, that respectively extends between a shackle 54 at the top of the lifting yoke 50 and a shackle 45 secured in a padeye 44 of a control (guide) part 40. The control part 40 forms an extension of the lifting frame 30. The function of the control part 40 and the mode of operation thereof are explained in closer detail in connection with the FIGS. 6-8 when the tool 20 is used with a connecting part.

FIG. 2 shows the same tool as in FIG. 1, now however, subdivided into modules, which will be convenient on many situations. This is explained at the very end of this specification. The modularly constructed tool 20M is assembled of a central lifting frame module 30M, a control module 40M releasable from the lifting frame module 30M and forms an extension of the lifting frame module 30M, and a lifting yoke module 50M releasable from the lifting frame module 30M. Otherwise, the remaining components are as before and have the same reference numbers as in FIG. 1.

Further the tool 20, 20M includes gripping mechanisms, which in a first situation can be activated to partly enclose and retain the pipeline end $E_2$. In a second situation, the gripping mechanisms can be released such that the pipeline end $E_2$ is released from the tool 20, 20M, typically when the tool 20, 20M is to be recovered to the surface.

The gripping mechanism is releasable from the pipeline end $E_2$ by operating actuation means 32. The actuation means 32 are entirely specific located and arranged such that they are easy accessible from above. The actuation means 32 are preferably operated by a remote controlled vessel (ROV), and is very easily operated from above.

In turn each gripping mechanism includes a pawl 33 which is pivotable arranged to the lifting frame 30, 30M. The pawl 33 is influenced by the actuation means 32. The lower end of the actuation means 32 acts against an inclined surface 34 of the pawl 33 in order to effect the pivotal motion of the pawl 33.

Moreover, at the rear end of the control module 40M, two hooks 46 are arranged, which in a quick release way are designed to cooperate with an axle pin 39a extending through holes in support brackets 39 of the lifting frame module 30M. Then the control module 40M can be hooked onto the lifting frame module 30M via the hooks 46 and the axle pins 39a, and be locked to each other by means of quick operated lock pins 41.

Figure 3:
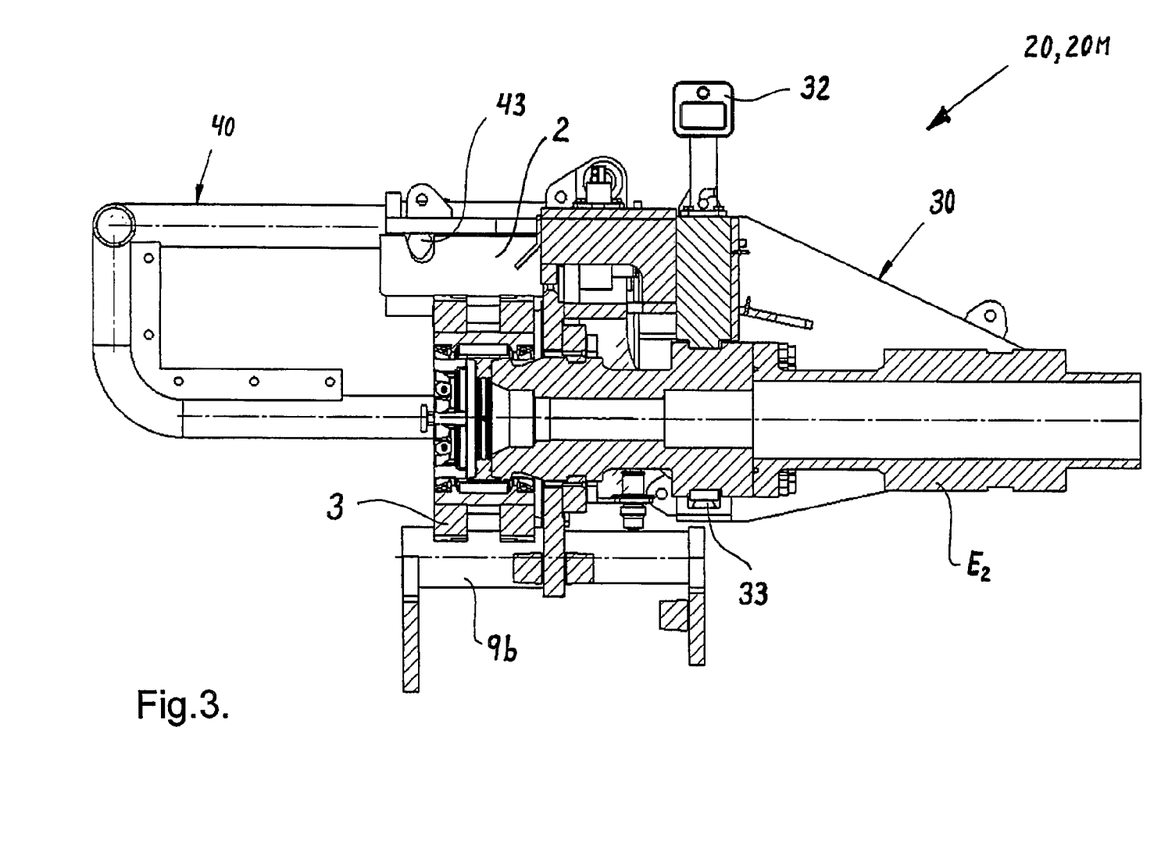
FIG. 3 shows in elevational view, partly in section, the tool and a connecting part retained by the tool.

FIG. 3 shows in elevation view and partly in cross section, the tool 20, 20M and a connecting part 2 retained in the tool. The connecting part 2 retains securely the pipe end $E_2$, and a connector 3 is standby ready for later connection. A more complete description is given later together with FIG. 6.

However, it is to be noted that the tool 20M as an entirety, alternatively the control module 40M alone, can be released from/alternatively connected to the connecting part 2. The control module 40M includes a lug or catch lever 43 that cooperates with a cutout or notch 23 arranged on the connecting part 2. The lug 43 and the notch 23 cooperate to securely retain the connecting part 2 to the control module 40M, yet with some freedom of motion. FIG. 2 shows a screw 47 that can be turned in and out. In that end facing forwards in FIG. 2, the screw is free of threads and is designed to be screwed as a plug into a hole 24 in an end plate 9 of the connecting part 2, see FIG. 6.

An alternative to the screw 47 can be a bayonet locking mechanism, which is a still more rapid locking mechanism.

Figure 4A:
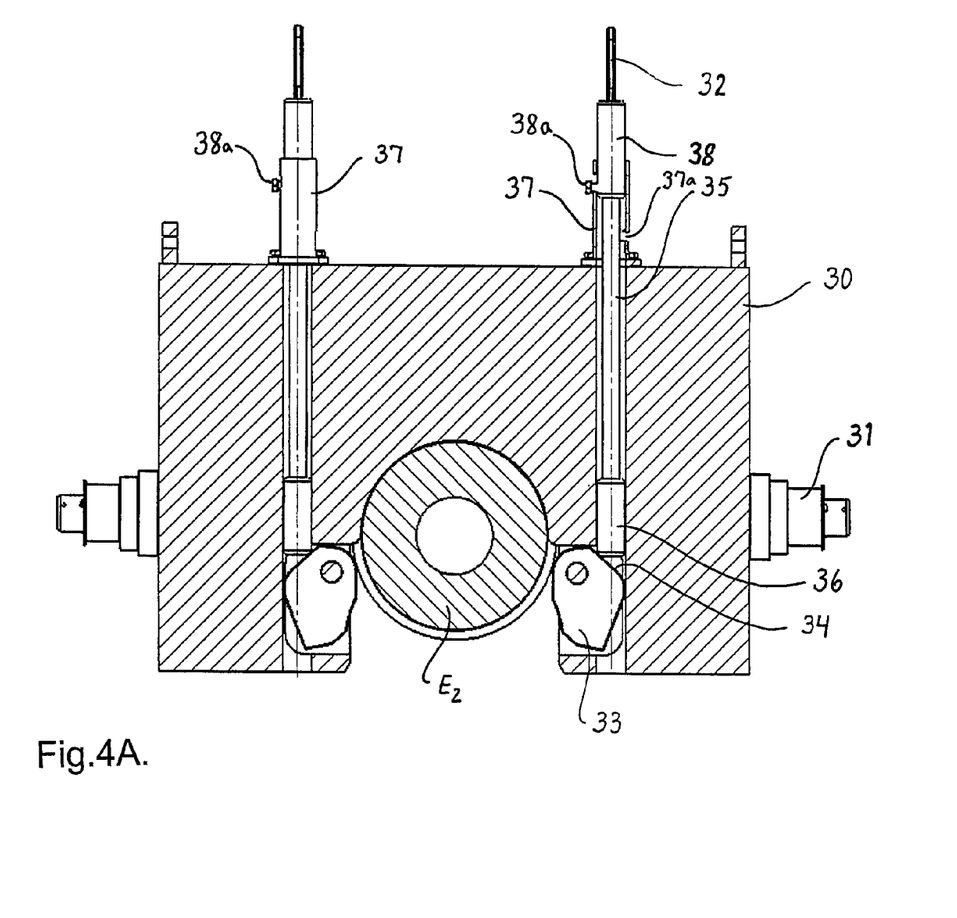
FIGS. 4A and 4B show a cross section through the lifting frame module of the tool and associate gripping means in open and closed position respectively.
Figure 4B:
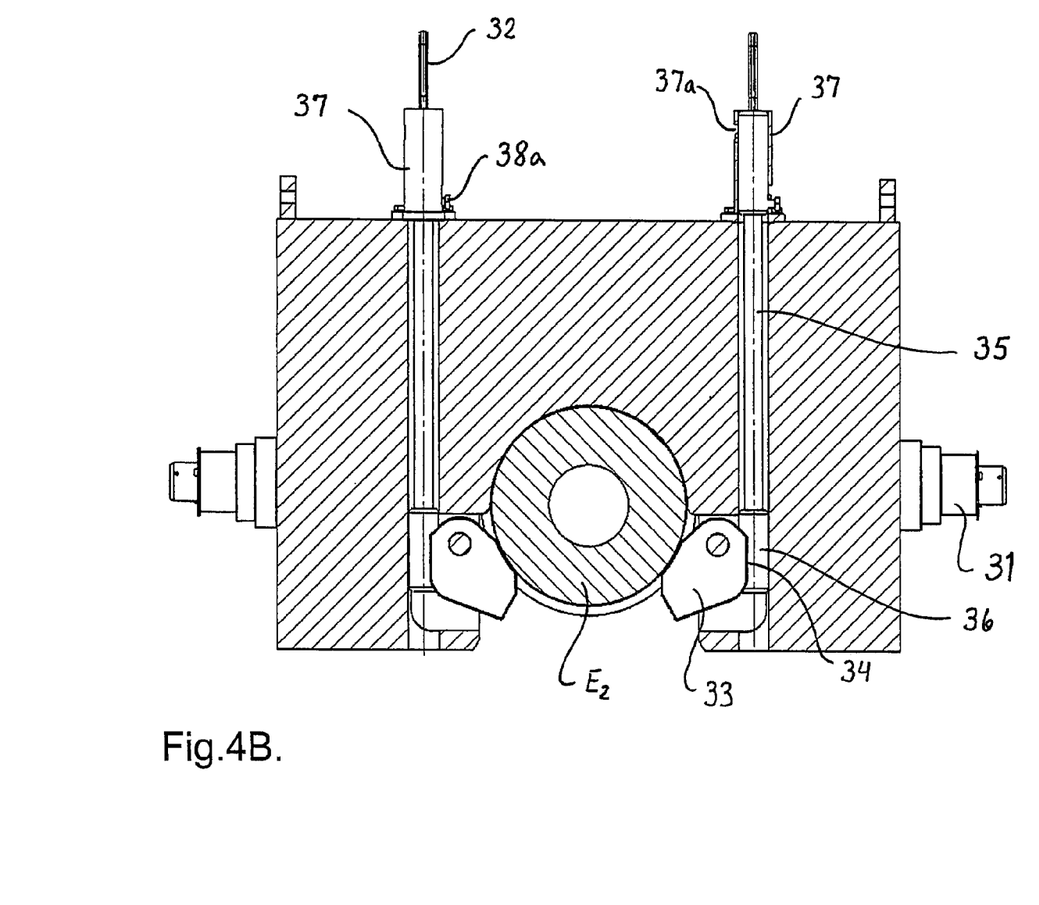

FIGS. 4A and 4B shows in closer detail the gripping mechanisms and associated actuation means 32 and pawls 33. FIG. 4A shows the pawls 33 in open position, i.e. in a position where a pipe end $E_2$ can be brought up and into the lifting frame 30, alternatively be released therefrom. FIG. 4B shows the pawls in closed position, i.e. in a position where the pipe end $E_2$ is fixedly retained in the lifting frame 30. The inclined surface 34 that the actuation means 32 acts against is also indicated. The actuation means 32 is here shown in the form of an actuation rod 35 having a lower end in the form of a mandrel body 36 that acts against the inclined surface 34 of the pawl 33.

A bayonet locking mechanism is arranged in the upper end of the actuation rod 35. The bayonet locking mechanism includes a sleeve part 37, having coulisse guides 37a, which id fixedly secured to the lifting frame 30, 30M. It further includes a mandrel part 38 having a projecting pin 38a which follows the coulisse guide 37a. The coulisse guide 37a can be a J-slot.

The operation of the bayonet locking mechanism takes place in that the actuation means 32 is influenced by a ROV that turns the means 32 in a quarter to half a revolution at the same time as the rod 35 is pushed down. This locks the pipe end $E_2$ to the lifting frame 30, 30M. By release, it is to be understood that the pawl 33 is self-releasable in the sense that when the rod 35 is elevated, the pawl is pivoting down by virtue of its own weight and thus opens for release from the pipe end $E_2$.

In one variant (not shown), the actuation rod can be a screw rod which is threaded and extends through a sleeve body (corresponding to the sleeve part 37) which is equipped with internal threads which allows the rod to be screwed up and down in order to act on the pawl 33.

The above described gripping mechanisms are mechanical solutions that are very sturdy and reliable in order to be fully failsafe. It is also to be explained that the locking mechanism is such designed that the high load forces extend right through the lock pawl and vertical rod 35 out to the lifting frame itself. Thereby one avoids that the loads extend up to the interface with the ROV, which enables the ROV to operate with small forces.

Figures 5A, 5B, 5C, 5D:
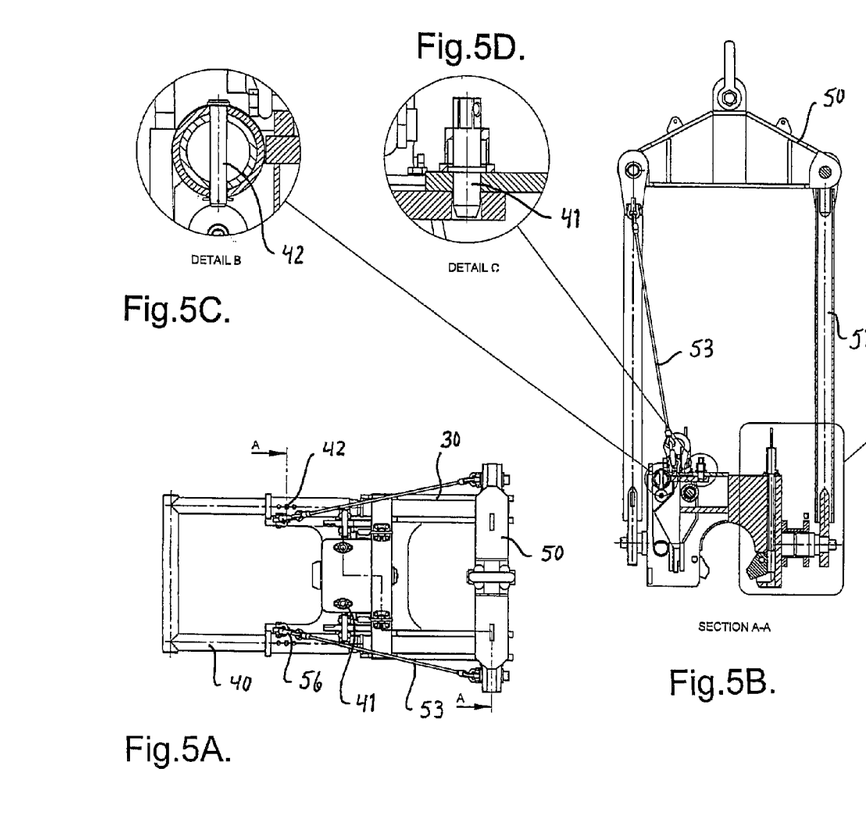
FIG. 5A shows the tool viewed from above and indicates a cross section A-A (not rectilinear) which is shown in FIG. 5B.
FIG. 5B shows the cross section along the line A-A (not rectilinear) in FIG. 5A.
FIG. 5C shows a detail section B from FIG. 5B which is encircled.
FIG. 5D shows a detail section C from FIG. 5B which is encircled.

FIG. 5A shows the tool 20, 20M from above including a cross section line A-A (not rectilinear). The sections are to show different details of the tool 20, 20M. These details shall for example show that the control module 40M is releasable from the lifting frame module 30M by means of quick release means, here shown in the form of the lock pin 41, or a cotter pin. See FIGS. 5A and 5D (Detail C). This in combination with the hooks 46 described above in connection with FIG. 2.

Figure 5E:
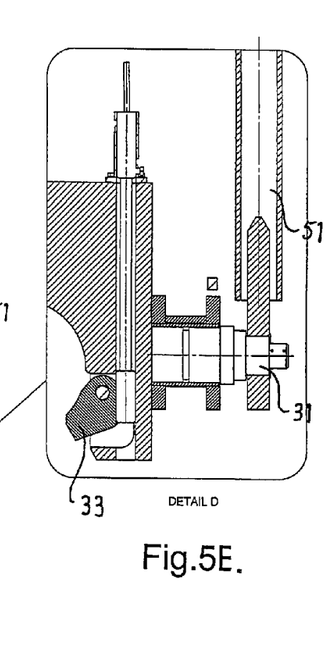
FIG. 5E shows a detail section D from FIG. 5B which is encircled.

As shown in FIG. 5E (Detail D), the lifting yoke module 50M is in turn releasable from the lifting frame module 30M by means of quick release means, such as cotter pins (not shown) at the end of the axle pins 31, to which the rods 51 are attached, and snap hooks 56 at the end of the straps 53 for attachment to the shackles 45 etc.

FIG. 5C (Detail B) shows a lock pin or cotter pin 42 for adjustment of a dampening effect that can be arranged in the control part 40. As indicated, three different positions (holes) exist into which one or more pins 42 can be put.

Figure 6:
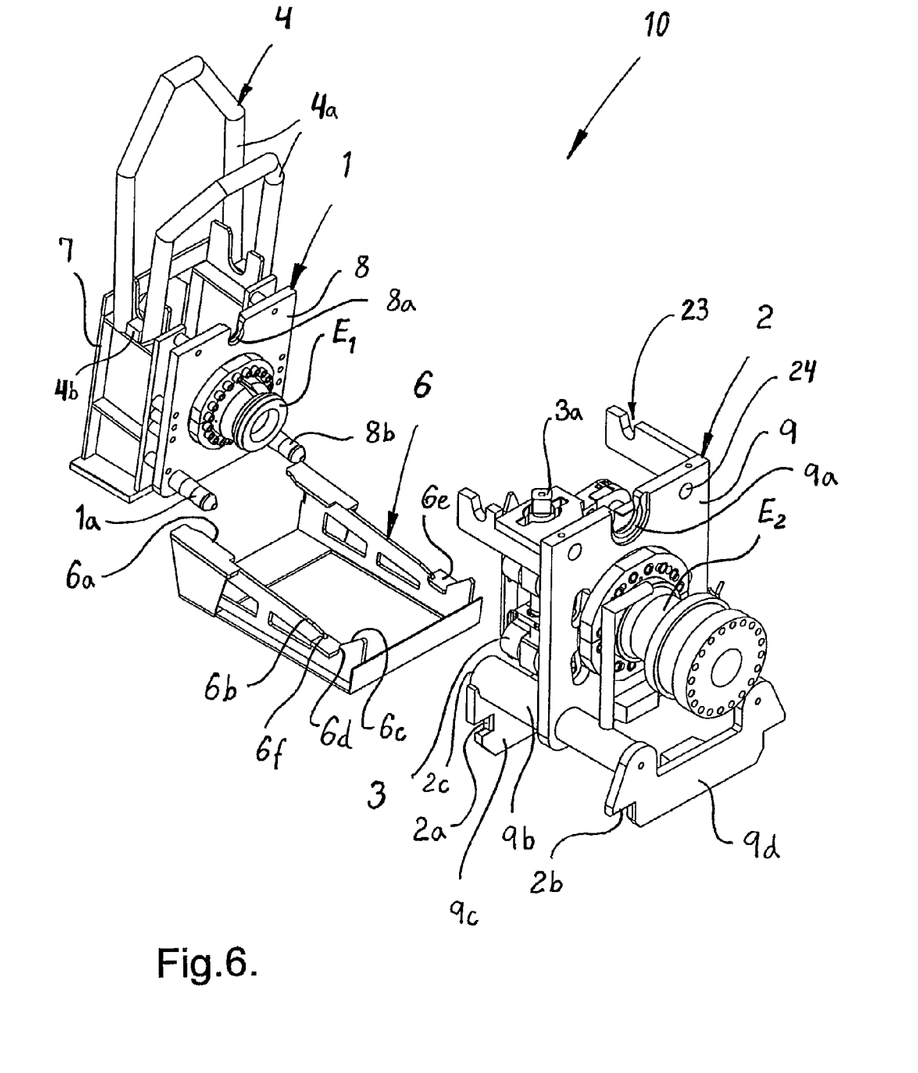
FIG. 6 shows in perspective view and with the parts apart from each other, the connecting device itself without the tool present.

Reference is now made to FIG. 6 that shows a complete connecting device 10 to which the tool 20, 20M is designed. The connecting device 10 is as previously mentioned assembled by a first connecting part 1, a second connecting part 2 and a ramp structure 6.

The first connecting part 1 is secured to a subsea structure (not shown), such as a manifold structure or a Christmas tree structure. The first connecting part 1 can be considered as stationary relative to the subsea structure. The first connecting part 1 is such arranged that it supports, or retains, the end $E_1$ of a first pipeline, which then will be located within the subsea structure. It is to be understood that the first connecting part 1 and the first pipeline will firstly be landed on the seabed (together with the subsea structure). The first connecting part 1 includes a control structure 4 located some distance apart from the pipe end $E_1$.

Later on, the second connecting part 2 is to be lowered from the surface in a direction towards the subsea structure, more precisely towards the first connecting part 1. With that, the second connecting part 2 can be considered as mobile relative to the subsea structure. The second connecting part 2 is such arranged that it retains the end $E_2$ of a second pipeline. The second connecting part 2 is moved by means of the tool 20, 20M described above.

The ramp structure 6 is located close to or adjacent to the first connecting part 1. The ramp structure 6 has a major function when the connecting parts 1, 2 are to be mated, and possibly at later occasions if disconnection is to be made. The ramp structure 6 is equipped with abutment surfaces and guiding means which are designed for engagement with cooperating surfaces and means on the second connecting part 2 when the second connecting part 2 is advanced towards the first connecting part 1. When this is performed fine alignment between the pipe ends $E_1$, $E_2$ is achieved.

A connector 3 is arranged on one of the connecting parts 1, 2, here shown on the second connecting part 2. After that the pipe ends $E_1$, $E_2$ are fine aligned with each other and pulled together until contact flange to flange, possibly with a seal therebetween, the connector 3 is activated and makes final, lasting connection between the pipe ends $E_1$, $E_2$. The connector 3 is operated by a ROV that turns a threaded bolt 3a on the connector 3.

The connector 3 will normally be of that type clamp connector having internally arranged, annular inclined surfaces, which by activation forces two pipe flanges axially towards each other. One of the pipe flanges has a sealing ring installed thereon having externally arranged, annular inclined surfaces. As a contemplated alternative, the connector can be of the type "collet connector".

It is to be emphasized that the ramp structure 6, in a preferred embodiment, is physically separated from the first connecting part 1. Then the second connecting part 2 can at desire, be parked on the ramp structure 6 after that a disconnecting operation between the connecting parts 1, 2 has been made. Then the subsea structure, which the first connecting part 1 is part of, can be recovered to the surface. Normally there are many such first and second connecting parts 1, 2 for each subsea structure and, as one will understand, all the second connecting parts 2 will remain parked on the ramp structure 6 on the seabed when the subsea structures need to be recovered to the surface for maintenance, modifications, repair, etc. The described physical separation is, however, not necessarily totally definite.

Further details of the ramp structure 6 and the first and second connecting part 1, 2, will now be described. To be precise, the guiding means of the ramp structure 6 are designed and shown as a projecting plate part 6a in the area adjacent to the first connecting part 1, as shown on the figures. Still to be precise, the cooperating means of the second connecting part 2 are designed and shown as an incision 2a, or a notch. Then it is to be understood that the projecting plate part 6a on the ramp structure 6 becomes in slidable engagement with the incision 2a when the pipe ends $E_1$, $E_2$ are moved towards each other in the terminating phase of the mating operation. When they are in complete engagement such prevents any tilting motion of the second connecting part 2 relative to the first connecting part 1.

The abutment, or contact surfaces of the ramp structure 6 can in turn include ramp surfaces as suggested by the reference number 6b. Correspondingly, the second connecting part 2 has contact surfaces 2b that cooperate with the ramp surfaces 6b when the second connecting part 2 is moved towards the first connecting part 1. When the notches 2a are in engagement with the plate parts 6a at the same time as the contact surfaces 2b are lifted by the ramp surfaces 6b during advancement of the second connecting part 2 towards the first connecting part 1, this motion provides fine alignment between the pipe ends $E_1$ and $E_2$.

Further, it is to be noted that at the very rear end of the ramp structure 6, upwardly projecting, inclined surfaces 6c are arranged, which surfaces terminate in a straight edge 6d down to the ramp structure 6. This inclined surface 6c is functioning to control the second connecting part 2, via the contact surfaces 2b, down to a base surface 6e on the top side of the ramp structure. When the contact surfaces 2b really has arrived at and in contact with the base surfaces 6e, the second connecting part 2 is prevented from unintentional motion rearwards due to the straight stop edge 6d. Also note that at the front end of the base surface 6e a smaller edge 6f is arranged. This edge 6f has the important function to be able to prevent the connecting part 2 from sliding in an uncontrolled way towards the connecting part 1, i.e. without any active mating by means of a pull/push tool (not shown), normally in the form of a linear motor of suitable and per se known type. By means of the stop edges 6d and 6f, the second connecting part 2 rests in peace on the base surfaces 6e due to it own weight.

Further details of the first connecting part 1 consist of a rear plate 7 and a front plate 8. The front plate 8 supports the first pipe end $E_1$. A plurality of braces is arranged between the rear plate 7 and front plate 8 in per se known manner. The front plate 8 has at least one adapted mounting 8a in the form of a U-shaped recess which is designed for insertion of the pull/push tool. Moreover, the front plate 8 includes at least one control pin 8b, here shown two in number, which are located in the lower portion of the front plate 8 and are pointing in a direction towards the second connecting part 2. The other pin 1a is designed to enter an opening 2c in the second connecting part 2 for guidance during mating of the two connecting parts 1, 2.

Further details of the second connecting part 2 consist of a main plate 9 that supports the second pipe end $E_2$. A plurality of tubular braces are perpendicular located on the main plate 9 and the lower hollow braces 9b simultaneously constitute guiding means in the form of a female part that is to cooperate with the above described control pin 8b during the finishing part of the mating operation of the connecting parts 1, 2. The main plate 9 also have at least one adapted mount 9a in the form of a U-shaped recess or cut-out, which is designed for insertion of the above described pull/push tool.

Further, a first connecting plate 9c is rigidly connected between the hollow braces 9b in that end facing toward the first connecting part 1, and a second connecting plate 9d is rigidly connected between the hollow braces 9b in that end facing away from the first connecting part 1. The first connecting plate 9c includes the previously described incisions 2a, or notches, that cooperate with the plate edges 6a on the ramp structure 6, i.e. more precisely those plate parts 6a that are facing inwardly of the ramp structure 6. The second connecting plate 9d includes the previously described contact surfaces 2b that in sequence cooperate firstly with the inclined surfaces 6c, then the base surface 6e and the stop edges 6d and 6f of the ramp structure 6, before the contact surfaces 2b start to ride on the ramp surfaces 6b during last phase of the mating operation.

Described in closer detail, the control structure 4 consists of an upwardly projecting frame structure 4a in two parts standing like a "Y" relative to each other and that are able to receive a corresponding control module 40M, which is arranged on the second connecting part 2 in the form of a removable tool 20. The control module 40M of the second connecting part 2 consists of a projecting bail structure 5a which, in an initial phase, in a sliding manner cooperates with the upwards projecting frame structure 4a of the first connecting part 1. When the bail structure 5a is completely introduced and bottoms against a part 4b of the upwardly projecting frame structure 4a, the second connecting part 2 is forced to pivot till abutment against the ramp structure 6. During this phase the pipe ends $E_1$, $E_2$ are coarse aligned relative to each other. The projecting bail structure 5a of the second connecting part 2 can, as mentioned, preferably be in the form of a tool that is releasable arranged and can be recovered to the surface after that the connection is made up.

Figure 7:
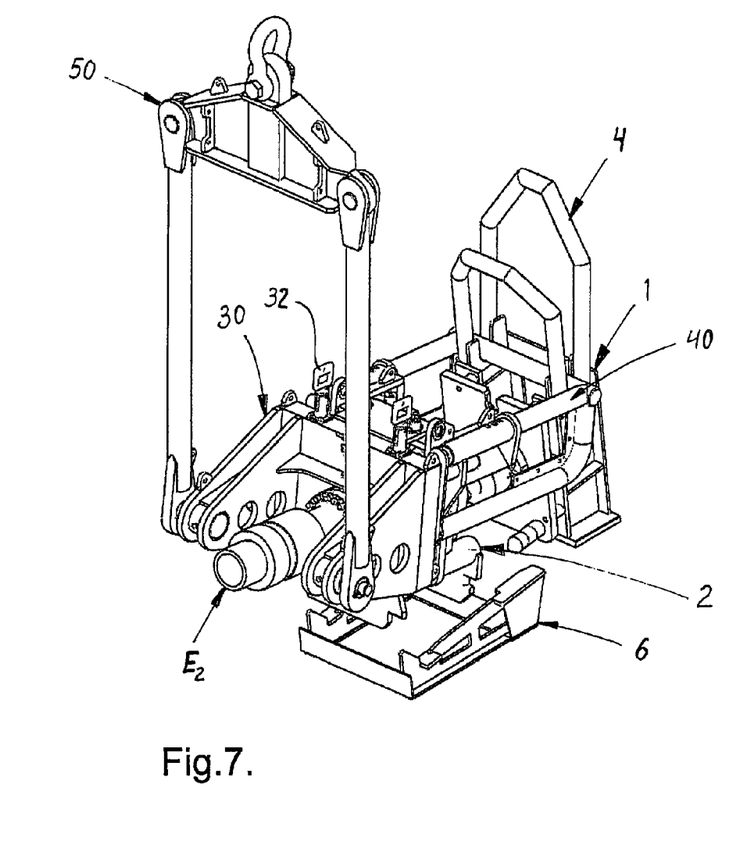
FIG. 7 shows in perspective view the tool when it carries along one pipeline end including a connecting part to be connected to a second connecting part.

FIG. 7 shows the complete tool 20, 20M that carries along the second connecting part 2 which in turn supports the pipe end $E_2$.

Figure 8A:
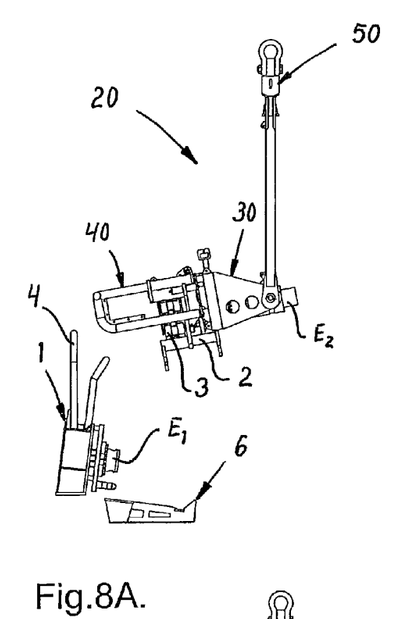
FIG. 8A to 8H show sequences of a connecting operation.

FIG. 8A to 8H show sequences of the mating operation that takes place between the connecting parts 1, 2 and by use of the ramp structure 6 as assisting means. FIG. 8A shows that the second connecting part 2 is lowered from the surface, for example from a surface vessel. The second connecting part 2 is designed to land on the ramp structure 6 as described above.

Figure 8B:
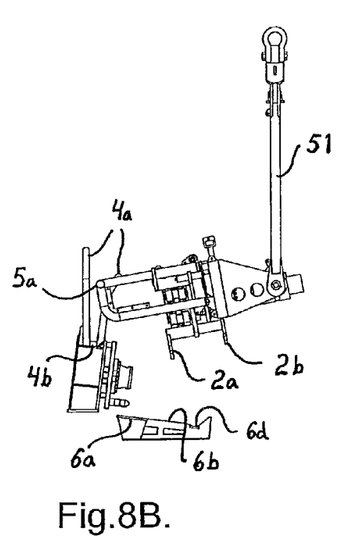

FIG. 8B shows that moment when the second connecting part 2 hits the first connecting part 1, in that the bail structure 5a hits the Y-configured, upwardly facing mouth of the frame structure 4a.

Figure 8C:
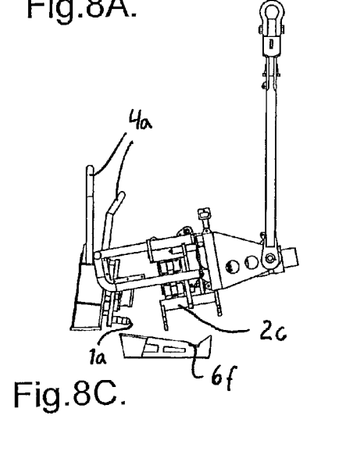

FIG. 8C shows that moment when the bail structure 5a bottoms in the frame structure 4a and starts to pivot towards the ramp structure 6 about a pivot point which is exactly located in the bottom of the frame structure 4a.

Figure 8D:
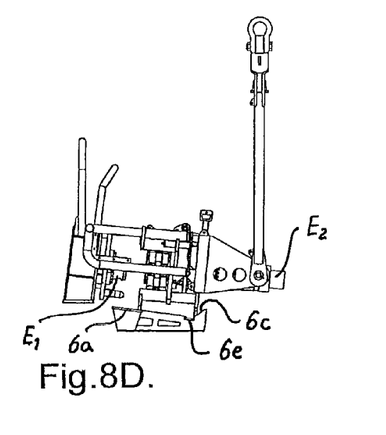

FIG. 8D shows that moment when the second connecting part 2 is landing on the ramp structure 6 and is controlled in by means of the inclined surfaces 6c. This is also that situation when the incisions 2a are controlled in and over the plate parts 6a in order to make engagement with each other.

Figure 8E:
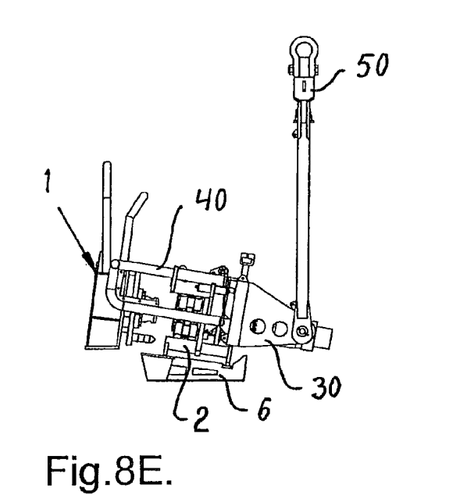

FIG. 8E shows first intermediate position before final connection is made. Now the contact surfaces 2b stand resting against the base surfaces 6e and are prevented by the stop edge 6d from rearward movement. The notches 2a are advanced to engagement with the plate parts 6a and prevent tilting motion as previously described.

Figure 8F:
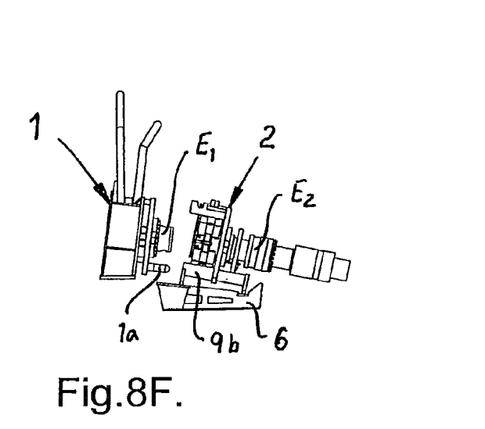

FIG. 8F shows the same situation for the connecting device 10 as FIG. 8E, but the installation tool 20 is removed and recovered to the surface for later use. When the tool 20 is removed, it is the edge 6f that prevents forward motion.

Figure 8G:
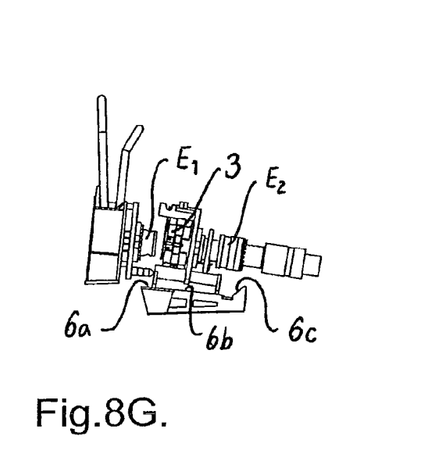

FIG. 8G shows the situation that the second connecting part 2 has been pulled toward the first connecting part 1 by means of the pull/push tool (not shown). The contact surfaces 2b has started to climb onto the ramp surfaces 6b and tilt the second pipe end $E_2$ upwards.

Figure 8H:
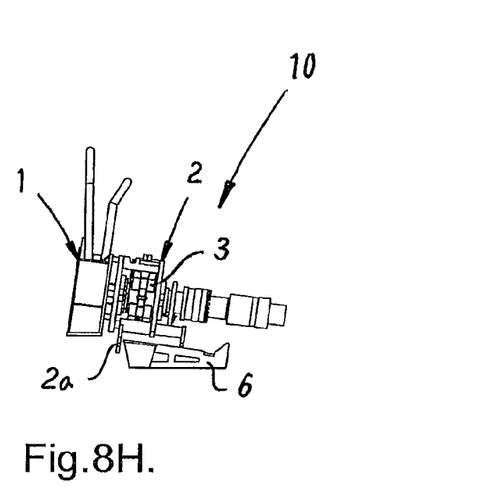

FIG. 8H shows the situation when the second connecting part 2 is completely mated with the first connecting part 1 and ready for actuation of the clamp connector 3 for final connection. The notches 2a have passed beyond the plate parts 6a and now remain in the free and are disengaged. After that final connection is made, also the contact surfaces 2b are lifted from the ramp surfaces 6b. Thus the entire second connecting part 2 is free from the ramp structure 6.

It is further to be understood that the above described solution is functioning as well on flexible pipeline as umbilical. The entire connecting operation is functioning in the same way, but with more pipes in the pipe end $E_2$, in addition to a connecting box (terminal) behind the end $E_2$ having electric/optical connectors.

When it comes to the modular construction, this has its particular benefit if one look into the solution according to previously mentioned Norwegian Patent Application NO2009 3107. In that application only the control module is shown, there given the reference number 5, and called a guide means 5. It is, however, to be understood that the guide means also acts as a tool which is used on the first end of a pipeline which is lowered from a surface vessel. Here, neither a lifting frame nor a lifting yoke is used, but a lifting means in the form of a chain including a shackle in its upper end which is secured directly to padeyes at the rear end of the guide means (or the tool). Since this is a tool, the same basic tool can be used in both ends of the pipeline, subsequent to some modifications.

The invention claimed is:

1. A retrievable tool for lowering, alternatively later retrieval, of a pipeline end, the pipeline end being provided with a connecting part designed for mating and connection with a first connecting part on the sea bed, and being so arranged that the tool can be brought to the surface again for reuse, said tool comprising:
    a central lifting frame;
    a guiding part forming an extension of the central lifting frame;
    a lifting yoke;
    a connector part releasably retained at a bottom surface of the central lifting frame, the connector part including a first contact portion and a second contact portion; and
    a ramp structure having:
        a base surface;
        a first inclined surface extending to a first edge of the base surface;
        a second inclined surface extending to a second edge of the base surface; and
        a plate part connecting to the second inclined surface,
    wherein the central lifting frame has a bottom edge, and a recess in the bottom edge configured to accommodate a pipeline end,
    wherein the retrievable tool is configured to engage and support the connector part provided on the pipeline end to be lowered towards the first connecting part located on the sea bed, and the retrievable tool, in its entirety, is configured to be released from the connecting part that is provided on the pipeline end so as to be brought to the surface again for reuse to lower, and alternatively later retrieve, another pipeline end, and
    wherein the plate part of the ramp structure is configured to engage the first contact portion of the connector part, and the base surface of the ramp structure is configured to engage the second contact portion of the connector part.

2. The retrievable tool according to claim 1, further comprising a pawl pivotably arranged to the lifting frame, the pawl being proximate the recess and having an inclined surface; and
    an actuating device configured to act against the inclined surface of the pawl to cause pivoting motion of the pawl, wherein the pawl has a first position to allow the pipeline end to enter the recess and a second position configured to retain the pipeline end in the recess.

3. The retrievable tool according to claim 2, wherein the actuating device comprises a rod extending upwardly from a top surface of the central lifting frame.

4. The retrievable tool according to claim 1, wherein the tool is configured to operate a connecting device, the connecting device including:
    a first connecting part retaining a first end of a first pipeline, wherein the first connecting part includes a control structure located a distance apart from the first end;
    a second submersible connecting part retaining a second end of a second pipeline; and
    a connector arranged between the connecting parts for final connection between the pipe ends.

5. The retrievable tool according to claim 4, wherein the control structure is an upwardly projecting frame structure configured to receive the guiding part.

6. The retrievable tool according to claim 5, wherein the second connecting part includes a projecting bail structure that, in an initial phase, in a sliding manner, cooperates with the upwardly projecting frame structure of the first connecting part, and when the bail structure is completely introduced into and bottoms out against a portion of the upwardly projecting frame structure, the second connecting part pivots until abutment with the ramp structure, said pipe ends are then coarsely aligned relative to each other.

7. The retrievable tool according to claim 4, wherein the first connecting part includes at least one control pin and the second connecting part includes a cooperating female part.

8. The retrievable tool according to claim 4, wherein the connector constitutes an integrated part of the connecting device, where the connector is secured onto the second connecting part and the second connecting part is displaceable in a direction towards and away from the first connecting part, where the pipe ends thus are positioned before final connection of the pipe ends by said connector.

9. The retrievable tool according to claim 1, wherein the guiding part is U-shaped, the guiding part having a first and second arm extending from the central lifting frame, and a central arm extending between the first and second arm.

10. The retrievable tool according to claim 1, wherein the central lifting frame has two opposite ends, the lifting yoke is pivotably connected to one end of said two opposite ends, extending upwardly from the central lifting frame, and the guiding part is connected to the other end of said two opposite ends, extending horizontally from the central lifting frame and operable to engage with the first connecting part on the sea bed.

11. A tool for raising and lowering a pipeline end, said tool comprising:
    a lifter, the lifter comprising:
        a central lifting frame;
        a guiding part forming an extension of the central lifting frame, the guiding part including a pair of side frames extending from the central lifting frame, and a front frame connecting the pair of side frames and extending between the pair of side frames; and
        a lifting yoke; and a connector comprising:
- a first connecting part retaining a first pipe end, the first connecting part releasably engaged with the central lifting frame, the first connecting part including a first contact portion and a second contact portion; and
- a second connecting part retaining a second pipe end, the second connecting part having a guide for receiving the guiding part;

a ramp structure having:
- a base surface;
- a first inclined surface extending to a first edge of the base surface;
- a second inclined surface extending to a second edge of the base surface; and
- a plate part connecting to the second inclined surface, wherein the connector, including the first connecting part and the second connecting part, is configured independently of the central lifting frame and the guiding part, wherein the guide comprises a pair of frame structures extending upwardly from the second connecting part, the pair of frame structures being spaced from one another, the front frame of the guiding part being received between the pair of frame structures, and the first connecting part is received between the pair of side frames; and wherein the plate part of the ramp structure is configured to engage the first contact portion of the first connecting part, and the base surface of the ramp structure is configured to engage the second contact portion of the first connecting part.

12. The tool according to claim 11, further comprising:
a first mating connector extending outwardly from the first connecting part; and
a second mating connector extending outwardly from the second connecting part,
wherein the first mating connector enagges the second mating connector to secure the first connecting part to the second connecting part.

13. A tool for raising and lowering a pipeline end, said tool comprising:
- a central lifting frame;
- a guiding part forming an extension of the lifting frame; and
- a lifting yoke extending from the lifting frame;
- a first connecting part including a first pipeline end;
- a second connecting part releasably retained at a bottom surface of the lifting frame, the second connecting part configured to retain a second pipeline end, the second connecting part including a first contact portion and a second contact portion; and
- a ramp structure having:
  - a base surface;
  - a first inclined surface extending to a first edge of the base surface;
  - a second inclined surface extending to a second edge of the base surface; and
  - a plate part connecting to the second inclined surface,
  - wherein the plate part of the ramp structure is configured to engage the first contact portion of the second connecting part,
  - wherein the base surface of the ramp structure is configured to engage the second contact portion of the second connecting part.

14. The tool according to claim 13, wherein the ramp structure is physically separated from the first connecting part and the second connecting part.

15. The tool according to claim 13, wherein the ramp structure includes a projecting plate part, and the second connecting part includes an incision,
wherein the projecting plate part and said incision come into engagement with each other when the pipe ends approach each other and prevent tilting motion of the second connecting part.

16. The tool according to claim 13, wherein the abutment surfaces of the ramp structure include ramp shaped surfaces that the cooperating surfaces of the second connecting part act against, and then provides fine alignment between the pipe ends when the second connecting part and the first connecting part are brought into contact.

\* \* \* \* \*